United States Patent
Ishiyama et al.

(10) Patent No.: US 9,963,056 B2
(45) Date of Patent: May 8, 2018

(54) SEAT HEATER AND A MANUFACTURING METHOD OF SEAT HEATER

(75) Inventors: Tomokazu Ishiyama, Hamamatsu (JP);
Masatsugu Saito, Hamamatsu (JP);
Yasuhiro Hase, Hamamatsu (JP);
Osamu Koide, Hamamatsu (JP)

(73) Assignee: KURABE INDUSTRIAL CO., LTD., Hamamatsu-shi, Shizuoka-ken (JP)

( * ) Notice: Subject to any disclaimer, the term of this patent is extended or adjusted under 35 U.S.C. 154(b) by 1231 days.

(21) Appl. No.: 10/244,658

(22) Filed: Sep. 17, 2002

(65) Prior Publication Data
US 2003/0111454 A1 Jun. 19, 2003

(30) Foreign Application Priority Data
Sep. 20, 2001 (JP) .................................. 2001-287680

(51) Int. Cl.
*H05B 3/00* (2006.01)
*H05B 3/54* (2006.01)
*B60N 2/56* (2006.01)

(52) U.S. Cl.
CPC ......... *B60N 2/5635* (2013.01); *B60N 2/5628* (2013.01); *B60N 2/5685* (2013.01); *B60N 2/565* (2013.01)

(58) Field of Classification Search
CPC .. B60N 2/5628; B60N 2/5685; B60N 2/5635; B60N 2/565
USPC ....... 219/217, 529, 549, 528, 212, 505, 633, 219/553, 535, 542, 545, 550; 174/35 GC; 156/274.6, 273.9, 313, 79, 94, 378; 62/244; 428/91, 95; 165/43
See application file for complete search history.

(56) References Cited

U.S. PATENT DOCUMENTS

| | | | | |
|---|---|---|---|---|
| 2,548,467 A | * | 4/1951 | Crise | 219/542 |
| 2,846,559 A | * | 8/1958 | Rosenberg | 219/505 |
| 2,948,802 A | * | 8/1960 | Shaw | 219/212 |
| 3,548,147 A | * | 12/1970 | Owers | 219/212 |
| 4,272,673 A | * | 6/1981 | Semanaz et al. | 219/544 |

(Continued)

FOREIGN PATENT DOCUMENTS

| | | | | |
|---|---|---|---|---|
| DE | 019928152 | * | 12/2000 | ............... B60N 2/56 |
| JP | 63-19068 | | 4/1988 | |

(Continued)

OTHER PUBLICATIONS

Official Gazette of Japanese Patent No. 2621437 (cols. 4-6, Fig. 3) (9 pages total).

(Continued)

*Primary Examiner* — Sang Y Paik
(74) *Attorney, Agent, or Firm* — Yokoi & Co., U.S.A.; Toshiyuki Yokoi

(57) ABSTRACT

To provide a seat heater and the manufacturing method thereof, having the stable adherent strength between the heating wire and the base cloth for a long time, with a good seat feeling, at a lower cost. The seat heater is comprising, a base cloth mixed with heat bonding filament, and a heating wire having a heat bonding layer and being placed in a predetermined pattern shape, in order to adhere to and be fixed on the base cloth by heat bonding under heat and pressure. Thus the stable adherent strength between the heating wire and the base cloth may be maintained for a long time, with a good seat feeling, at a lower cost.

23 Claims, 8 Drawing Sheets

(56) References Cited

U.S. PATENT DOCUMENTS

| | | | |
|---|---|---|---|
| 4,308,417 A * | 12/1981 | Martin | 174/35 GC |
| 4,429,215 A * | 1/1984 | Sakai et al. | 219/528 |
| 4,549,653 A * | 10/1985 | Lauritzen | 206/441 |
| 4,590,359 A * | 5/1986 | Mobius | 219/217 |
| 4,628,188 A * | 12/1986 | Andreasson | 219/528 |
| 4,633,061 A * | 12/1986 | Arikawa | 219/202 |
| 4,697,064 A * | 9/1987 | Altmann et al. | 219/217 |
| 4,825,048 A * | 4/1989 | Altmann et al. | 219/528 |
| 4,836,871 A * | 6/1989 | Kato | 156/79 |
| 4,846,916 A * | 7/1989 | Kobayashi et al. | 156/274.6 |
| 4,964,674 A * | 10/1990 | Altmann et al. | 297/180 |
| 5,068,141 A * | 11/1991 | Kubo et al. | 428/219 |
| 5,111,025 A * | 5/1992 | Barma et al. | 219/217 |
| 5,532,035 A * | 7/1996 | Corbin et al. | 428/95 |
| 5,558,794 A * | 9/1996 | Jansens | 219/549 |
| 5,814,569 A * | 9/1998 | Suzuki et al. | 442/328 |
| 5,824,996 A * | 10/1998 | Kochman et al. | 219/529 |
| 6,079,485 A * | 6/2000 | Esaki et al. | 165/43 |
| 6,318,102 B1 * | 11/2001 | Asou et al. | 62/244 |
| 6,452,138 B1 * | 9/2002 | Kochman et al. | 219/549 |
| 6,479,797 B1 * | 11/2002 | Yanagimoto et al. | 219/213 |
| 6,489,595 B1 * | 12/2002 | Check et al. | 219/217 |
| 6,531,687 B2 * | 3/2003 | Michelmann | 219/529 |

FOREIGN PATENT DOCUMENTS

| | | | | |
|---|---|---|---|---|
| JP | 407031563 | * | 2/1995 | A47K 13/30 |
| JP | 408131294 | * | 5/1996 | A47C 7/74 |
| JP | 2000060680 | | 2/2000 | A47C 7/74 |
| JP | 2000060680 A | * | 2/2000 | A47C 7/74 |

OTHER PUBLICATIONS

Official Gazette of Japanese Patent Publication No. 6-68964 (6 pages total).

Official Gazette of Japanese Examined Utility Model Publication No. 6-25916 (6 pages total).

Official Gazette of Japanese Unexamined Patent Publication No. 6-119967 (5 pages total).

* cited by examiner

US 9,963,056 B2

SEAT HEATER AND A MANUFACTURING METHOD OF SEAT HEATER

BACKGROUND OF THE INVENTION

1. Field of the Invention

The present invention relates to a seat heater which may be used for e.g. heating of a vehicle seat, and a manufacturing method of the seat heater. More particularly, the present invention relates to a seat heater in which, a heating wire is provided on a base cloth, thereby the sufficient and stable adherent strength between the heating wire and the base cloth may be maintained for a long period of time, and in which a good seat feeling may be accomplished at a lower cost.

2. Description of the Related Art

There have been several conventional seat heaters, for example, a heater in which a winding (zig-zag) form of heating wire is placed on a sewable supporting body such as a cloth, so that the heating wire may be sewn and secured to the cloth by upper thread and lower thread (e.g. see a patent document 1), or a heater in which a winding (zig-zag) form of heating wire is placed on a supporting body such as a cloth, and is then caught and fixed between a pair of cloth sheets of which surfaces are coated with adhesive agents (e.g. see a patent document 2).

These seat heaters are actually used, for example by being inserted into a position between a seat pad and a surface cover of a vehicle seat.

Patent Document 1:

Official Gazette of Japanese Patent No. 2621437 (columns 4-6, FIG. 3); and

Patent Document 2:

Official Gazette of Japanese Examined Patent Publication No. Sho 63-19068 (column 3, FIG. 5).

In addition, although not prior arts directly relating to the seat heater, there are three cases which might have any relation as follows:

Patent Document 3:

Official Gazette of Japanese Examined Utility Model Publication No. Hei 6-25916;

Patent Document 4:

Official Gazette of Japanese Unexamined Patent Publication No. Hei 6-68964; and

Patent Document 5:

Official Gazette of Japanese Unexamined Patent Publication No. Hei 6-119967;

However, the above prior arts have the following disadvantages.

First, according to the structure in which the heating wire is sewn and fixed on the supporting body (i.e. the prior art as shown in the patent document 1), when a passenger sits on and leaves the seat, the application and the release of the load of the passenger shall repeatedly occur, thereby the thread might be loosened or cut, which would further result in a deviation of the heating wire inside the seat. When the heating wire is deviated from the regular position, there is a possibility that the seat may not be heated uniformly. This is very dangerous, since the deviated heating of the seat might cause the concentrated overheating of any part of the seat.

Thus, there have been several suggestions as the countermeasure therefor, for example to reduce the sewn pitch during fixing of the heating wire, or to fix the heating wire more tightly by increasing the sewing strength. However, in these cases, the supporting body must be made of any material having a sufficient thickness, and must also at least satisfy a required hardness.

However, when the above discussed supporting body is selected, there would arise another problem that the touch of the seat heater might become hardened, and thereby the seat feeling might become poor.

Further, as the fixing of the seat heater by sewing is very laborious, and the productivity is not good. Accordingly, there is another problem that the production cost would become higher.

On the other hand, according to the structure in which the heating wire is inserted and fixed in a position between the pair of cloth sheets with the adhesive agents thereon (i.e. the prior art as shown in the patent document 2), as the two supporting bodies must be used, and there exists the layer of the adhesive agent between these sheets, the touch might also become hardened, and the seat feeling might also become poor.

Further, this type of seat heater requires many component parts, and since the cloth sheet, of which surface being coated with the adhesive, is very expensive, the production cost would increase considerably.

SUMMARY OF THE INVENTION

It is an object of the present invention to provide a seat heater in which, the stable adherent strength between the heating wire and the base cloth may be maintained for a long period of time, and in which a good seat feeling may be accomplished at a lower cost. Further, it is another object of the present invention to provide a method to manufacture such seat heater.

To achieve the object mentioned above, according to an exemplary aspect of the present invention, there is provided a seat heater, including, a base cloth being mixed with heat bonding filament; and a heating wire having a heat bonding layer and being placed in a predetermined pattern shape on the base cloth, whereby the heating wire may adhere to and be fixed on the base cloth, by means of heat bonding under application of heat and pressure.

According to another exemplary aspect of the present invention, there is provided a seat heater, wherein the heat bonding layer of the heating wire is provided at the top surface layer of the heating wire.

According to another exemplary aspect of the present invention, there is provided a seat heater, wherein the heating wire is adhering to and fixed on the base cloth, in a form that the base cloth is dented by the heating wire.

According to another exemplary aspect 4 of the present invention, there is provided a seat heater, wherein, the heat bonding filament of the base cloth is filament, having a core-sheath combination structure, in which, heat bonding resin serves as the sheath.

According to another exemplary aspect of the present invention, there is provided a seat heater, wherein, the filament having the core-sheath combination structure, in which the heat bonding resin serves as the sheath, shall be filament having the core-sheath combination, structure in which low-melting point polypropylene serves as the sheath, or filament having the core-sheath combination structure in which polyethylene serves as the sheath, or filament having the core-sheath combination structure in which low-melting point polyester serves as the sheath.

According to another exemplary aspect of the present invention, there is provided a seat heater, further including detached part, at which the heating wire may be detached from the base cloth without being pulled together with the base cloth, at portion where pulling force is applied to the base cloth toward a seat sewing as an object of installation.

According to another exemplary aspect of the present invention, there is provided a seat heater, further including non-bonding portion serving as the detached part, at which the heating wire does not adhere to and is not fixed on the base cloth.

According to another exemplary aspect of the present invention, there is provided a seat heater, wherein the base cloth is mixed with the heat bonding filament, at a mixing rate of the heat bonding filament between 5% and 15%.

According to another exemplary aspect of the present invention, there is provided a seat heater, wherein the base cloth is adhering to not less than 30% of an outer periphery of the heating wire.

According to another exemplary aspect of the present invention, there is provided a seat heater, wherein the heat bonding layer of the heating wire is in color.

According to another exemplary aspect of the present invention, there is provided a seat heater, wherein the seat heater is incorporated in a vehicle seat.

According to another exemplary aspect of the present invention, there is provided a seat heater, wherein the vehicle seat is equipped with an air conditioner.

According to another exemplary aspect of the present invention, there is provided a manufacturing method of seat heater, including, a step of placing and forming a beating wire having a heat bonding layer, in a predetermined pattern shape on a press aid; a step of placing a base cloth, mixed with heat bonding filament, facing to the heating wire formed and placed in the predetermined pattern shape; and a step of moving a pressing plate positioned to be facing to the press aid, so that the pressing plate may relatively become close to the press aid, whereby the heating wire adheres to and is fixed on the base cloth under heat and pressure applied to each other.

According to another exemplary aspect of the present invention, there is provided a manufacturing method of seat heater, wherein, predetermined part of the press aid or the pressing plate is provided with hollow part, whereby detached part may be provided, at which the heating wire may be detached from the base cloth without being pulled together with the base cloth.

And according to another exemplary aspect of the present invention, there is provided a seat heater, wherein a state of the detached part may be arbitrarily determined by adjusting the depth of the hollow part.

Therefore, according to the seat heater of the present invention, the seat heater is provided with the base cloth being mixed with the heat bonding filament, and the heating wire having the heat bonding layer and being placed in a predetermined pattern shape on the base cloth, whereby the heating wire may adhere to and be fixed on the base cloth, by means of heat bonding under application of heat and pressure. Consequently, the seat heater may have the stable adherent strength between the heating wire and the base cloth for a long time, with a good seat feeling, at a lower cost. This is a novel structure of the seat heater, and this also express the inherent function and effect of the present invention.

Preferably, the seat heater may be provided at the top surface layer of the heating wire. In this case, the heating wire may be effectively melted, and hence, may adhere to and be fixed on the base material.

Preferably, the seat heater may adhere to and be fixed on the base cloth, in a form that the base cloth is dented by the heating wire. Consequently, the wide adherent area may be secured, and thus the strong adherent state may be obtained.

Further, since the protrusive amount of the heating wire may be minimized, thereby the good seat feeling may be obtained.

Preferably, the heat bonding filament of the base cloth is may be any filament, having the core-sheath combination structure, in which the heat bonding resin serves as the sheath. For example, it is possible to use the filament having the core-sheath combination structure in which the low-melting point polypropylene serves as the sheath, or the filament having the core-sheath combination structure in which polyethylene serves as the sheath, or the filament having the core-sheath combination structure in which the low-melting point polyester serves as the sheath.

The material of the filament is of course not limited to the above filament materials.

Further, the seat heater may be provided with the detached part, at which the heating wire may be detached from the base cloth without being pulled together with the base cloth, at the portion where the pulling force is applied to the base cloth toward a seat serving as an object of installation. At such part, the heating wire might be pulled together with the base cloth, which would cause the heating wire being cut. Therefore, when the detached part is provided at such part, even when the base cloth is pulled, no harmful effect will be given to the heating wire, and eventually there is no risk of the heating wire being cut.

Preferably, the non-bonding portion serving as the detached part, at which the heating wire does not adhere to and is not fixed on the base cloth, may be provided. Further, it will be possible to provide, for example, the non-bonding portions and the bonding portions one after another, so that they may serve as the detached part, or the adhering and fixed part at which adherent strength is small, so that it may serve as the detached part.

Preferably, the base cloth may be mixed with the heat bonding filament, at a mixing rate of the heat bonding filament between 5% and 15%. When the mixing rate of the heat bonding filament is less than 5%, the sufficient adherent strength between the heating wire and the base cloth may not be obtained. On the other hand, when the mixing rate of the heat bonding filament is more than 15%, the base cloth may be hardened, which would result in the poor touch feeling of the seat.

However, if it is expected to obtain a certain degree of this effect, the present invention is not limited to the above value.

Preferably, the base cloth may adhere to not less than 30% of the outer periphery of the heating wire, for the purpose of obtaining the good adherent strength.

However, if it is also expected to obtain a certain degree of this effect, the present invention is not limited to the above value.

Preferably, the heat bonding layer of the heating wire may be in color, so that the bonding state (adherent state) between the heating wire and the base cloth may be confirmed easily by the eyes. That is, as for the seat heater in which the heating wire and the base cloth have been melted and bonding to each other, when an inspector sees the seat heater from the reverse side (the side on which the heating wire is not placed), the inspector may see the transparent color of the heat bonding layer of the heating wire. And on the other hand, if there is any trouble in regard to the heat bonding state between the heating wire and the base cloth, the inspector cannot see the transparent color of the heat bonding layer of the heating wire. This function is very useful from the viewpoint of the quality control of the products. The present invention may also express such secondary effect.

The seat heater according to the present invention may be used for various purposes, and for example, the seat heater may be incorporated in a vehicle seat.

For example, the vehicle seat may be equipped with the air conditioner. In this case, since the seat heater according to the present invention has the simple structure that the heating wire adheres to and is fixed on a single sheet of the base cloth, the seat heater has a good ventilation performance, and there is no possibility that the seat heater would cause any bad effect to the air supply by the air conditioner.

According to the manufacturing method of seat heater of the present invention, first, the heating wire having the heat bonding layer is placed and formed, in a predetermined pattern shape on the press aid. Thereafter, the base cloth, mixed with the heat bonding filament, is placed, facing to the heating wire formed and placed in the predetermined pattern shape. Thereafter, the pressing plate, positioned to be facing to the press aid, is moved, so that the pressing plate may relatively become close to the press aid, whereby the heating wire adheres to and is fixed on the base cloth under heat and pressure applied to each other. Thus the desired seat heater may be effectively produced.

Preferably, predetermined part of the press aid or the pressing plate may be provided with the hollow part, whereby the detached part may be provided, at which the heating wire may be detached from the base cloth without being pulled together with the base cloth. Thus, it is possible to obtain the seat heater having the detached part at the arbitrary position.

Preferably, the state of the detached part may be arbitrarily determined by adjusting the depth of the hollow part. In regard to the adjusting means for the hollow part, for example, it is possible to change and set the depth of the hollow part depending on each case, or it is also possible to adjust the depth by intervening elastic materials, etc., having an appropriate thickness, in the hollow part. Accordingly, it is possible to provide the various form of the detached part, for example, in which the non-bonding portions and the bonding portions are provided one after another, so that they may serve as the detached part, or which adheres to and is fixed on the base cloth by a small adherent strength, in order to serve as the detached part.

As discussed above, according to the seat heater of the present invention, the base cloth being mixed with the heat bonding filament, adheres to and is fixed on the heating wire, having the heat bonding layer and being placed in a predetermined pattern shape on the base cloth, by means of heat bonding under application of heat and pressure. Consequently, the good touch feeling of the seat is not deteriorated, and the sufficient adherent strength between the heating wire and the base cloth may be maintained for a long period of time.

Further, the complicated sewing procedure in the prior art is no longer required.

Further, the number of essential parts may be remarkably reduced, thereby the production cost will be also remarkably reduced. Thus, the seat heater may be provided at a lower cost.

Where the seat heater is provided at the top surface layer of the heating wire, the heating wire may be effectively melted, and hence, may adhere to and be fixed on the base material.

Where the seat heater adheres to and is fixed on the base cloth in a form that the base cloth is dented by the heating wire, the wide adherent area may be secured, and thus the strong adherent state may be obtained. Further, since the protrusive amount of the heating wire may be minimized, the good seat feeling may be obtained.

Where the seat heater is provided with the detached part, even when the pulling force is applied to the base cloth toward a seat serving as an object of installation, and thereby the base cloth is pulled, no harmful effect will be given to the heating wire, and there is no risk of the heating wire being cut.

Where the base cloth is mixed with the heat bonding filament, at a mixing rate of the heat bonding filament between 5% and 15%, the sufficient adherent strength may be obtained between the heating wire and the base cloth, and it is also possible to prevent the base cloth from being hardened, which would cause the poor touch feeling of the seat.

Where the base cloth adheres to not less than 30% of the outer periphery of the heating wire, the good adherent strength may be obtained.

Where the heat bonding layer of the heating wire is in color, it is possible to also obtain the secondary effect, that the bonding state (adherent state) between the heating wire and the base cloth may be confirmed easily by the eyes.

Where the seat heater is incorporated in a vehicle seat equipped with the air conditioner, since the seat heater of the present invention has the simple structure that the heating wire adheres to and is fixed on a single sheet of the base cloth, the seat heater has a good ventilation performance, and there is no possibility that the seat heater would cause any bad effect to the cold/hot air supply by the air conditioner.

Further, according to the manufacturing method of seat heater of the present invention, it is possible to easily produce the seat heater having the desired structure.

BRIEF DESCRIPTION OF THE DRAWINGS

The invention will be described below in detail with reference to the accompanying drawings, in which.

DETAILED DESCRIPTION OF THE INVENTION

First Embodiment

A first embodiment of the present invention will now be described with reference to FIGS. 1 through 6B. The first embodiment will show an example presuming that the present invention is applied to a seat heater for vehicles.

Figure 1:
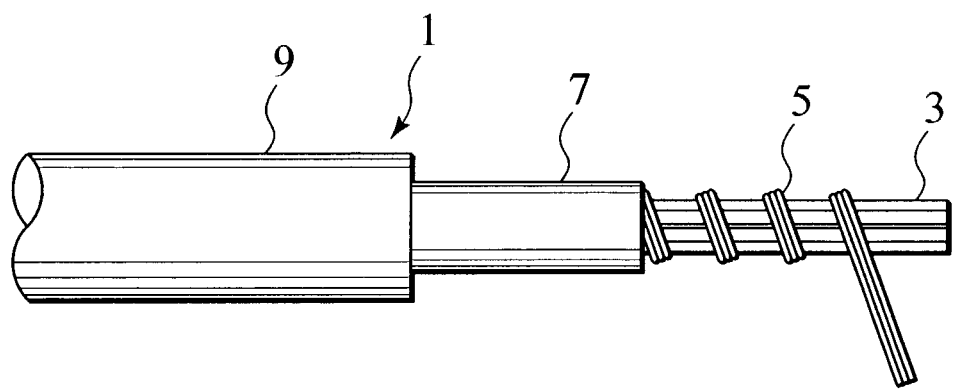
FIG. 1 is a side view showing a structure of a heating wire in which several structural elements being partially cut out therefrom, according to a first embodiment of the present invention.

The structure of a heating wire 1 according to the first embodiment will now be made, with reference to FIG. 1. There is a heater core 3 made of a bundle of aromatic polyamide fibers of which outer diameter is about 0.2 mm, and a heating body 5 twists in the spiral shape around the outer periphery of the heater core 3, at a pitch about 0.7 mm. The heating body 5 comprises six paralleled string heaters, of which respective outer diameter is 0.08 mm, made of tin plated had copper-tin alloy (TH-SNCC-3). The outer periphery of the above discussed heating body 5 is coated by an extruded insulating layer 7, having the thickness of about 0.15 mm, and made of the copolymer of tetrafluoroethylene and hexafluoropropylene (FEP). Further, the outer periphery of the insulating layer 7 is coated by an extruded heat bonding layer 9, having the thickness of 0.2 mm, and made of polyethylene (PE). This is the structure of the heating wire 1, of which outer diameter as the finished product is 1.1 mm.

As above discussed, according to the present embodiment, the heat bonding layer 9 is provided on the outer periphery of the insulation layer 7, as the separate layer. However, it is also possible, for example, to provide a single layer composed of the mixture of the two layers.

Further, although the above heater core 3 has the effective strength when considering the bending strength (flexibility) or the tensile strength, it is also possible to use, instead of the heater core 3, a heating body made of a plurality of paralleled string heaters, or a stranded string heaters.

The structure of a base cloth 11 (shown in FIGS. 2 through 4 and 6A and 6B 6), serving as the base material for the adhesion and fixing of the heating wire 1 as discussed above, will now be described. The base cloth 11 according to the present embodiment is made the mixture of non-woven fabric (of which weight per unit area is 100 g/m², and the thickness is 0.6 mm), with a predetermined percentage (3%, 5%, 10%, 15% or 30%) of core-sheath combination filament 112 (see FIG. 6B) including a core 112b and a sheath 112a which is made of low-melting point polyester serving as a heat bonding filament (hereinafter "low-melting point polyester filament").

The mixture having 3% of the low-melting point polyester filament shall be used in "a first embodiment". Similarly, the mixture having 5% of the low-melting point polyester shall be used in "a second embodiment", that having 10% of the low-melting point polyester shall be "a third embodiment", that having 15% of the low-melting point polyester shall be "a fourth embodiment", and that having 30% of the low-melting point polyester shall be "a fifth embodiment".

As discussed above, although the embodiments of the present invention uses the core-sheath combination filament of which sheath is made of low-melting point polyester as the heat bonding filament, it is also possible to use, for example, core-sheath combination filament of which sheath is made of low-melting point polypropylene, or core-sheath combination filament of which sheath is made of polyethylene, etc.

Although the size and the thickness of the base cloth 11 may vary almost freely according to the purpose of use, preferably, the thickness (measured in the dry state) may be e.g. between 0.6 mm-1.4 mm. If such thickness of the base cloth 11 is selected, when the heating wire 1 adheres to and is fixed on the base cloth 11 by heat and pressure, not less than 30% of the outer periphery of the heating wire 1, or preferably not less than 50% thereof, may effectively adhere to the base cloth 11, thereby the two materials may strongly adhere to each other. This state will be explained in detail afterwards.

Figure 2:
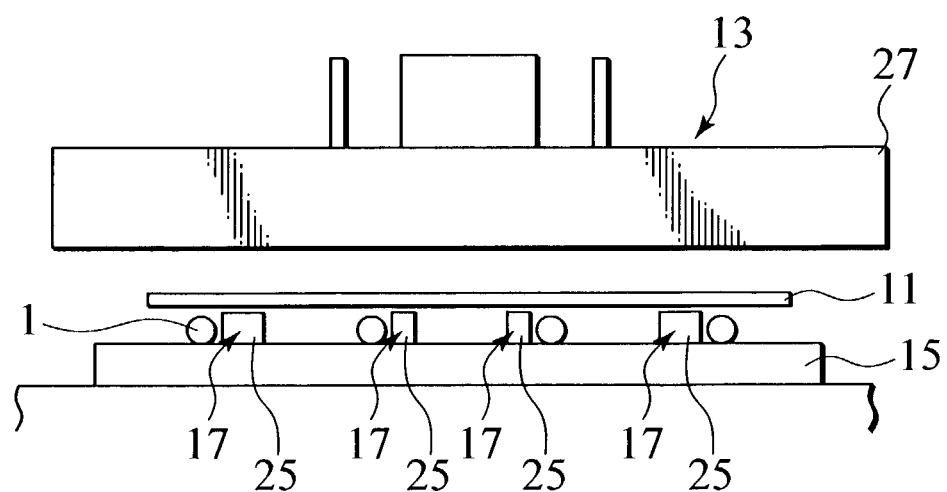
FIG. 2 is side view showing a structure of a hot pressing type of heater manufacturing apparatus according to the first embodiment of the present invention.
Figure 3:
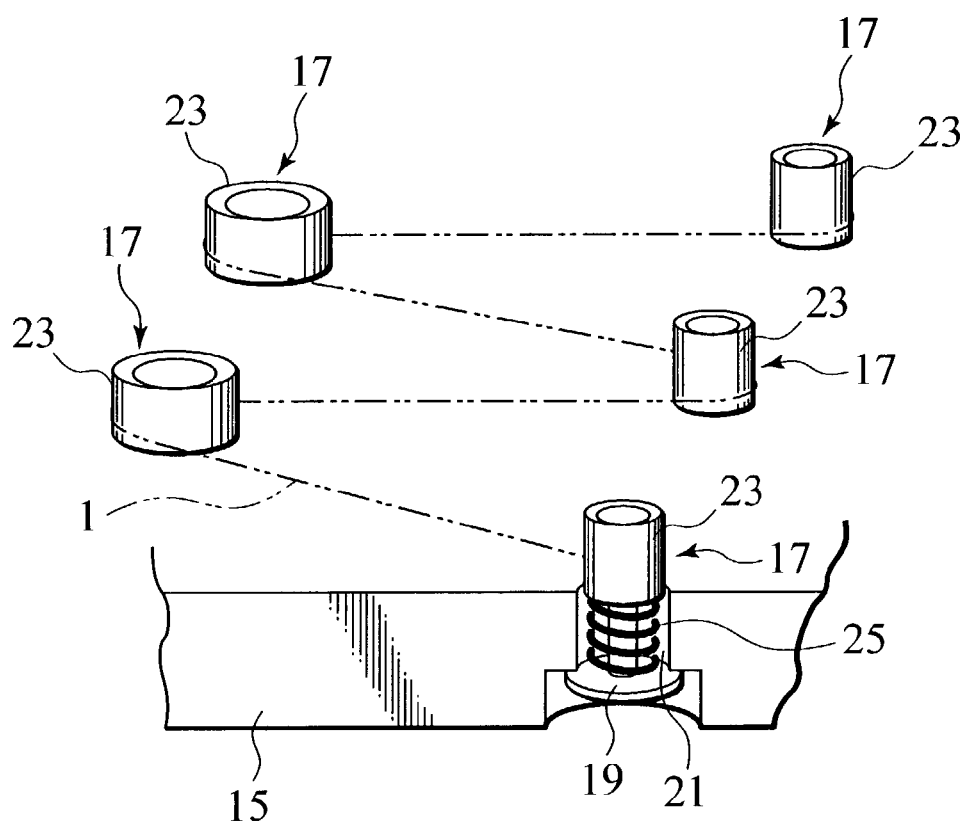
FIG. 3 is a partial perspective view showing a state that the heating wire is placed in a predetermined pattern form according to the first embodiment of the present invention.

Now the structure of adhesion and fixing of the heating wire 1 on the base cloth 11 as discussed above, by placing the heating wire 1 in a predetermined pattern form on the base cloth 11, will now be explained. FIG. 2 illustrates the structure of a hot-press type heater manufacturing apparatus 13, whereby the heating wire 1 may adhere to and be fixed on the base cloth 11. There is a hot pressing aid 15, on which upper surface is provided with a plurality of hooking devices 17. As illustrated in FIG. 3, each of the hooking devices 17 is provided with a pin 19, upwardly inserted in a hole 21 from the bottom of the hot pressing aid 15. The hole 21 has been drilled in the hot pressing aid 15. There is a hooking member 23 at the upper part of the pin 19, so that the hooking member 23 may move in the axial direction of the pin 19. There is a coil spring 25, which always applies the force upwardly to the hooking member 23. Further, as illustrated by an imaginary line of FIG. 3, the heating wire 1 is hooked on each of the hooking members 23 of the hooking devices 17, so that the heating wire 1 is placed in a predetermined pattern form.

Now referring back to FIG. 2, there is a pressing hot plate 27 having an elevation mechanism, above the plurality of the hooking devices 17. First, the heating wire 1 is hooked on the plurality of the hooking members 23 of the hooking devices 17, so that the heating wire 1 may be placed in the predetermined pattern form, and the base cloth 11 is laid on the top of these hooking members 23. In that state, the pressing hot plate 27 goes down, so that the heat and pressure, for example, at the temperature of 230° C., for 5 seconds, may be applied to the heating wire 1 and the base cloth 11. Thus, a heat bonding layer 9 on the side of the heating wire 1, and the heat bonding filament on the side of the base cloth 11, that is the low-melting point polyester filament, may be melted and connected to each other, thereby the heating wire 1 may adhere to and be fixed on the base cloth 11.

When the pressing hot plate 27 goes down in order to apply the pressure and heat, the plurality of the hooking members 23 of the hooking devices 17 will go down, against the upward force of the coil springs 25 applied to the hooking members 23.

Figure 4:
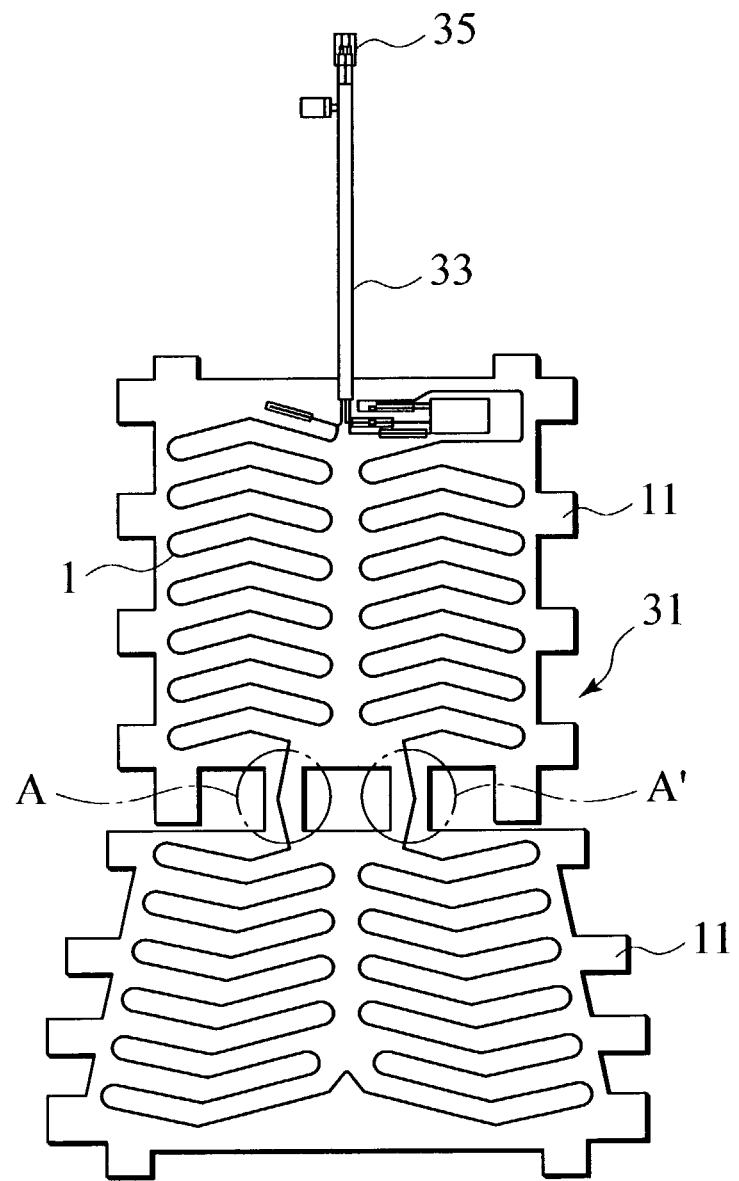
FIG. 4 is a plan view of showing a structure of the seat heater according to the first embodiment of the present invention.

Consequently, it is possible to obtain a seat heater 31 for a vehicle, as illustrated in FIG. 4.

The both ends of the heating wire 1 of the seat heater 31 as discussed above, are electrically connected to a cable 33, and the end of the cable 33 has a connector 35, by which the seat heater 31 may be electrically connected to an unillustrated electric system of the vehicle.

Figure 5:
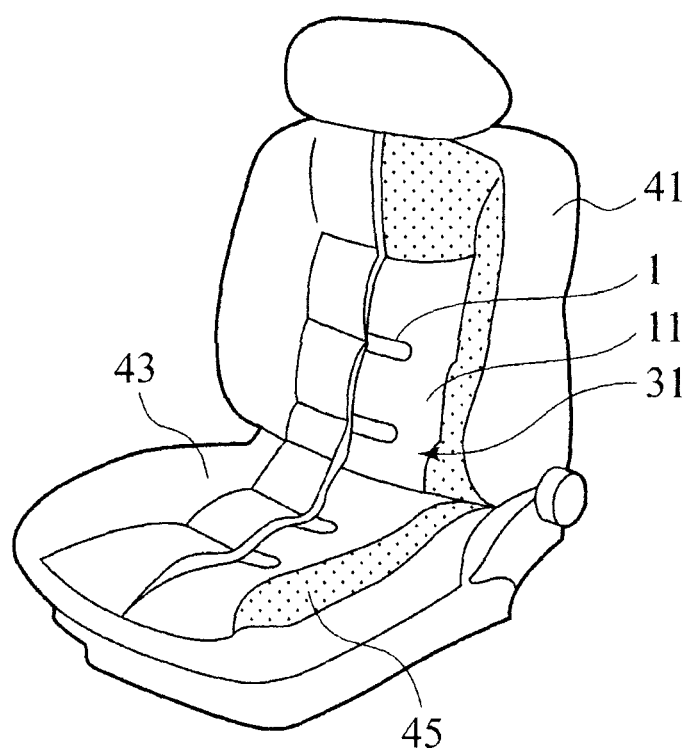
FIG. 5 is a perspective view showing a state that the seat heater is embedded in a vehicle seat, in which several structural elements of the vehicle seat being partially cut out therefrom, according to the first embodiment of the present invention.

The seat heater 31 having the structure as discussed above is incorporated in a vehicle seat 41, as illustrated in FIG. 5. According to FIG. 5, the seat heater 31 is inserted in a position between a surface cover 43 and a seat pad 45.

Figure 6A:
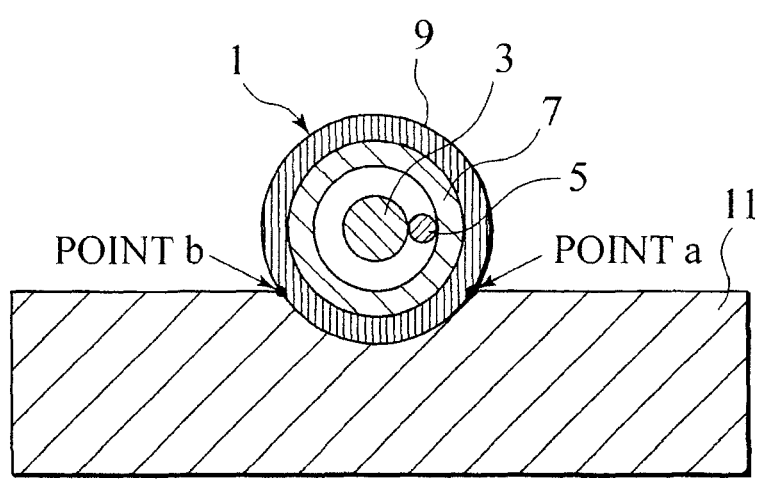
FIG. 6A is an enlarged sectional view showing a joint part at which the heating wire adheres to and is fixed on a base cloth.
Figure 6B:
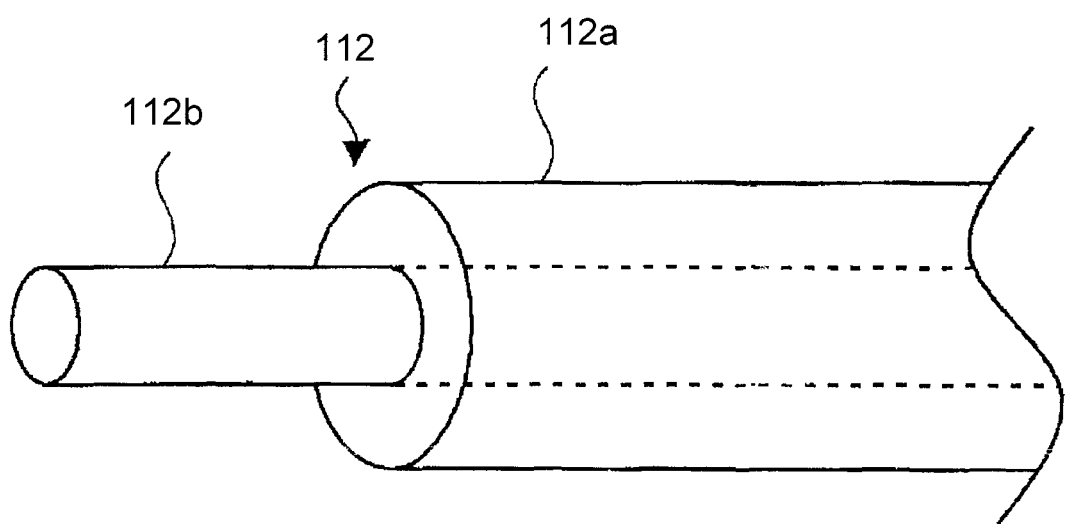
FIG. 6B illustrates a heat bonding filament having a core-sheath combination structure, according to the first embodiment of the present invention.

FIG. 6A is an enlarged view showing the state that the heating wire 1 adheres to and is fixed on the base cloth 11. As illustrated in FIG. 6A, when the heating wire 1 adheres to and is fixed on the base cloth 11, not less than 30%, and preferably not less than 50% of the outer periphery of the heating wire adhere to the base cloth 11 with a sufficient strength. In this connection, "not less than 30%" or "not less than 50%" does not mean the value, obtained by the total area of adhering part, in which the heat bonding filament as the essential element of the base cloth 11, i.e. the low-melting point polyester adheres to the heat bonding layer 9 on the outer periphery of the heating wire 1, being divided by the total surface area of the heating wire. Instead, as illustrated in FIG. 6A, this means the value of the apparent adhering area as viewed in the sectional direction of the seat heater 31 when the heating wire 1 adheres to the base cloth 11 (i.e. the percentage obtained in the manner that the distance between a point "a" and a point "b" being divided by the circumferential length of the outer periphery of the heating wire 11. Thus, the heating wire 1 adheres to and is fixed on the base cloth 11 more strongly. Further, at that time, the heating wire 1 is placed in a form that the base cloth 11 is dented by the heating wire 1. Therefore, for example, when the heating wire 1 is provided in the vehicle seat 41, the heating wire 1 will not protrude from the surface cover 43 of the vehicle seat 41, and the passenger may not feel the existence of any foreign articles.

The thus obtained five types of seat heater 31 (the example 1 through the example 5) were used as the samples, in order to assess the characteristics in regard to the touch (seat feeling) and the adherent strength thereof. The result will be shown in the Table 1 below:

TABLE 1

|  | Exp. 1 | Exp. 2 | Exp. 3 | Exp. 4 | Exp. 5 |
|---|---|---|---|---|---|
| Low-melting point polyester filament mixture rate (%) | 3 | 5 | 10 | 15 | 30 |
| Non-woven fabric unit volume (g/m$^2$) | 100 | 100 | 100 | 100 | 100 |
| Non-woven fabric thickness (mm) | 0.6 | 0.6 | 0.6 | 0.6 | 0.6 |
| Feeling of existing any foreign article (%) | 0 | 0 | 0 | 0 | 80 |
| Adherent strength (N/piece) | 3 | 9.8 | 10.7 | 11.4 | 12.0 |
| State of destruction | 3/5 partially exfoliated | 5/5 material destroyed | 5/5 material destroyed | 5/5 material destroyed | 5/5 material destroyed |

First, as for the touch (seat feeling) of each example, the seat heater 31 was inserted in a position between the seat pad 45 and the surface cover 43 of the vehicle seat 41, and ten people actually sat on the respective vehicle seats 41. The ten people were then questioned if there was any feeling of a foreign article, as compared with the other same type of vehicle seats 41 in which the seat heaters 31 were not provided respectively.

According to the test result, there was no one that felt the existence of the foreign article as for the vehicle seats 41, respectively provided with the seat heater 31 having within 15% of the low-melting point polyester filament mixture (i.e. the example 1 through the example 4). However, as for the vehicle seat 41 provided with the seat heater 31 of which mixture rate of the low-melting point polyester filament was exceeding 15% (i.e. the example 5), eight people felt the existence of the foreign article.

As for the adherent strength, the adherent strength of each sample was measured based on the T-type exfoliation test method prescribed under Japan Industrial Standard (JIS) K 6854, and the maximum value when being pulled at the speed of 500 mm/min was used as the detected value. In addition, the state of destruction was also recorded. The result is as per illustrated in the above Table 1.

As a result, the sufficient adherent strength was obtained for a long period of time, as for the seat heaters 31 of which mixture rates of the low-melting point polyester filament are not less than 5% (the example 2 through the example 5). However, as for the vehicle seat 41 provided with the seat heater 31 of which mixture rate of the low-melting point polyester filament was less than 5% (i.e. the example 1), the heating wire 1 was exfoliated from the base cloth 11.

According to the test result as discussed above, it was proven that the seat heater 31 having a good touch feeling as well as the sufficient adherent strength could be obtained when the mixture rate of the low-melting point polyester filament serving as the structural element of the base cloth 11 was between 5% and 15%.

There was a further test executed according to the present embodiment, in which, three types of seat heater 31 were prepared by varying the unit volume and the thickness of the non-woven fabric, and by setting the fixed mixture rate of the low-melting point polyester filament as 5%, respectively (the example 6 through the example 8; the example 6 was the same sample as the example 2), in order to obtain the adherent strength data. At the same time, the adherent rate between the outer periphery of the heating wire 1 and the non-woven fabric was measured. The structure of examples, other than the non-woven fabric, was the same as that of the example 1 through example 5 discussed above. The result will be shown in the Table 2 below:

TABLE 2

|  | Exp. 6 | Exp. 7 | Exp. 8 |
|---|---|---|---|
| Low-melting point polyester filament mixture rate (%) | 5 | 5 | 5 |
| Non-woven fabric unit volume (g/m$^2$) | 100 | 120 | 150 |
| Non-woven fabric thickness (mm) | 0.6 | 0.9 | 1.4 |
| Feeling of existing any foreign article (%) | 0 | 0 | 0 |
| Adherent strength (N/piece) | 9.8 | 11.0 | 13.2 |

TABLE 2-continued

|  | Exp. 6 | Exp. 7 | Exp. 8 |
|---|---|---|---|
| State of destruction | 5/5 material destroyed | 5/5 material destroyed | 5/5 material destroyed |
| Adherent rate of the outer periphery of heater (%) | 30 | 50 | 70 |

As a result, each example expressed the sufficient adherent strength, and among others, the best adherent strength was obtained in the case of the example 8, i.e. the unit volume of the non-woven fabric was 150 g/m$^2$, and the thickness thereof was 1.4 mm. According to the example 8, it was also proven that 70% of the outer periphery of the heating wire 1 adhered to the non-woven fabric. Although the example 6 showed the lowest adherent strength (9.8 N), this value would still be in the scope of the sufficient strength for practical use. The example 6 also showed that 30% of the outer periphery of the heating wire 1 adhered to the non-woven fabric. Consequently, it was proven that, if at least 30% of the outer periphery of the heating wire 1 adhered to the base cloth 1, the seat heater 31 according to the present invention could obtain the sufficient adherent strength for practical use.

Second Embodiment

A second embodiment of the present invention will now be described with reference to FIG. 7. According to the first embodiment as discussed above, as an example showing the fundamental structure of the heating wire, it is described that the heating body is provided, in which a plurality of paralleled string heaters wound around the outer periphery of the heater core. However, the present invention is of course not limited to this first embodiment.

Figure 7:
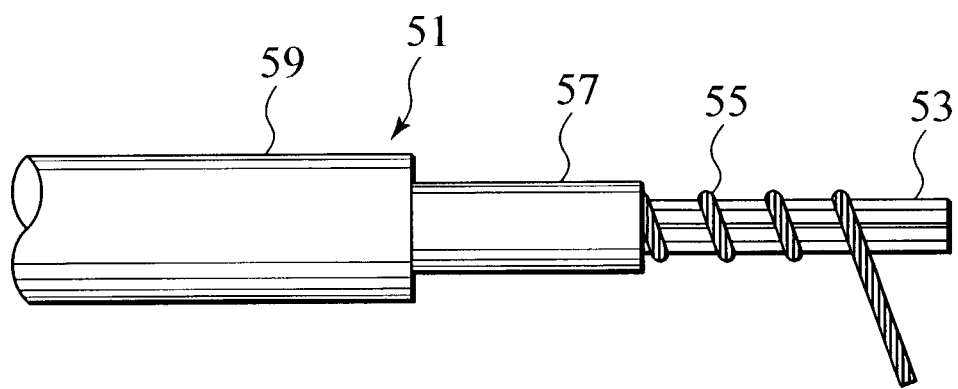
FIG. 7 is a side view showing a structure of a heating wire in which several structural elements being partially cut out therefrom, according to a second embodiment of the present invention.

For example, according to the second embodiment, it is also possible to apply the present invention to a so-called "high tensile strength type" of heating wire 51 as illustrated in FIG. 7. The detailed explanation will be made below.

The structure of the heating wire 51 according to the second embodiment will now be made. There is a core 53 made of a bundle of aromatic polyamide fibers, and a heating body 55 twists in the spiral shape around the outer periphery of the heater core 53. The heating body 55 is in the shape of a stranded string heaters made of copper string or copper-nickel alloy string. The outer periphery of the above discussed heating body 55 is coated by an extruded insulating layer 57, having the thickness of about 0.15 mm, and made of the copolymer of tetrafluoroethylene and hexafluoropropylene (FEP). Further, the outer periphery of the insulating layer 57 is coated by an extruded heat bonding layer 59, having the thickness of 0.2 mm, and made of polyethylene (PE). This is the structure of the heating wire 51, of which outer diameter as the finished product is 1.1 mm.

Accordingly, it is also possible to apply the present invention to this "high tensile strength type" of heating wire 51 as discussed above, in the same manner as that of the first embodiment, thereby the almost same effect as that of the first embodiment may be obtained.

Third Embodiment

Figure 8:
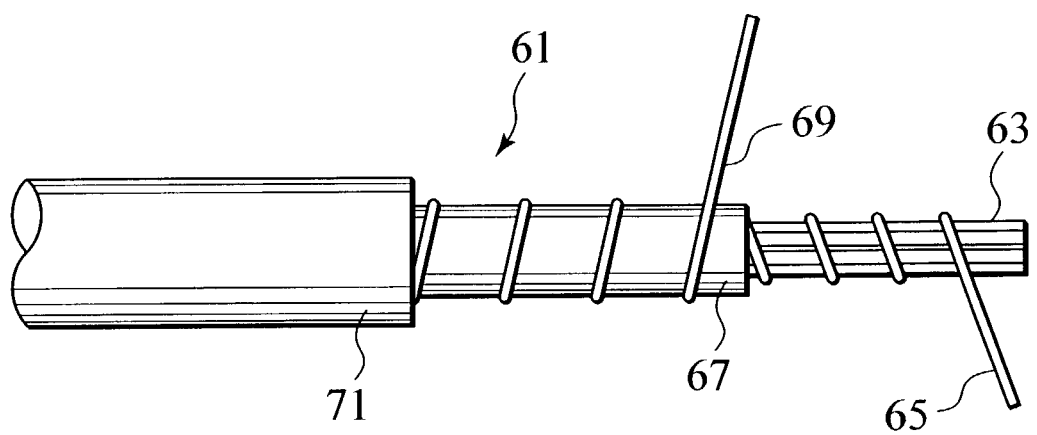
FIG. 8 is a side view showing a structure of a heating wire in which several structural elements being partially cut out therefrom, according to a third embodiment of the present invention.

A third embodiment of the present invention will now be described with reference to FIG. 8. FIG. 8 illustrates the structure of a so-called "single-wire type" of heating wire 61, and it is also possible to apply the present invention to this type which means of the heating wire 61, likewise the case of the first embodiment and the second embodiment.

The structure of the heating wire 61 according to the third embodiment will now be made. There is a heater core 63 made of a glass fiber or a polyester fiber, and a heating body 65 twists in the spiral shape around the outer periphery of the heater core 63. The heating body 65 comprises a string heater.

It is also possible that the heating body 65 may comprise a plurality of the string heaters.

The outer periphery of the above discussed heating body 65 is coated by an extruded fuse layer 67, made of resin categorized as polyamide such as nylon-11 or nylon-12. Further, there is a nickel wire 69 serving as a heat detecting line and as a signal line, twisting in the spiral shape around the outer periphery of the fuse layer 67. The outer periphery of the fuse layer 67 and the nickel wire 69 is integrally coated by an extruded heat bonding layer 71, having the thickness of 0.2 mm, and made of polyethylene (PE). This is the structure of the heating wire 61, of which outer diameter as the finished product is 1.1 mm.

Accordingly, it is also possible to apply the present invention to this "single-wire type" heating wire 61 as discussed above, in the same manner as those of the first embodiment and the second embodiment.

Fourth Embodiment

Figure 9:
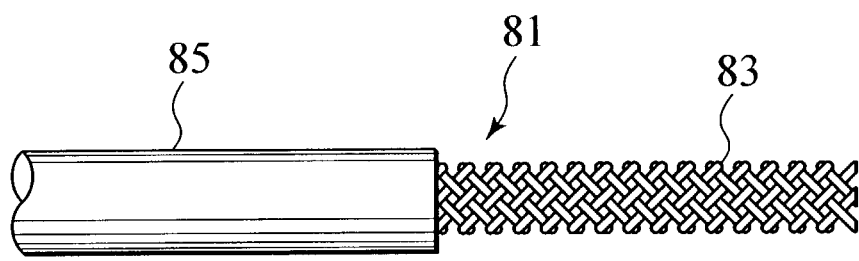
FIG. 9 is a side view showing a structure of a heating wire in which several structural elements being partially cut out therefrom, according to a fourth embodiment of the present invention.

A fourth embodiment of the present invention will now be described with reference to FIG. 9. FIG. 9 illustrates the structure of a so-called "braid type" of heating wire 81, and it is also possible to apply the present invention to this type of the heating wire 81, likewise the case of the first through the third embodiments.

The structure of the heating wire 81 according to the fourth embodiment will now be made. There is a braided cord structure type of resistive conductor 83. The resistive conductor 83 is made of a plurality of thread bundles braided by a publicly known braiding method, so as to form a continuous braid pattern extending in the elongating direction. The thread bundles may be braided in a hollow cylindrical shape, or braided on a core thread, and the core thread shape will be preferable, because that shape will improve the bending strength (flexibility) or the tensile strength, and because that shape will be advantageous for the stable resistivity in order to serve as the heater, and for the constant outer diameter of the finished product.

The preferable material of the core thread may be glass filament, polyester filament, aromatic polyamide filament, wholly aromatic polyester filament, etc.

As for the plurality of the thread bundles, a metal wire resistor material is used, at least partially, for the thread bundles in any one direction (i.e. either in the right spiral direction or the left spiral direction), and an insulating filament material is used for the thread bundles in the other direction.

As for the metal wire resistor material, it is possible to use a copper wire, a copper alloy wire, a nickel wire, a steel wire, an aluminum wire, a nickel-chromium alloy wire, etc. This wire may be used in a form of a single wire, or a stranded wires. The wire may be used without any coating thereon, or with an insulation coating material. Any material serving for insulating electricity, already known as a prior art, may be used for the insulation coating material. The necessity of the insulation coating material will be determined on a case-by-case basis, according to the using condition of a cord-type resistor body obtained by the present invention.

As for the filament of the insulation material, it is possible to use inorganic filament such as fiber glass, or polyester filament such as polyethylene terephthalate, or organic filament such as aliphatic polyamide filament, aromatic polyamide filament, wholly aromatic polyester filament, etc. This kind of material may be used in the form of monofilament, multi-filament or span. It is also possible to use a heat bonding filament having a core-sheath combination structure, in which, any of these filament materials, or an organic polymer material comprising any of these filament materials, may serve as the core material, so that the outer periphery of the core material may be coated by the sheath material made of an organic polymer material having thermo plasticity, such as polyolefin, polyester, polyvinyl chloride resin, polyamide resin, etc. These materials may be selected on a case-by-case basis, according to the balance of the strength of the thread bundles in the right spiral direction and the left spiral direction, and the using condition when used as of the heating wire 81.

The outer periphery of the resistive conductor 83 is coated by an extruded heat bonding layer 85, having the thickness of 0.2 mm, and made of polyethylene (PE). This is the structure of the heating wire 81, of which outer diameter as the finished product is 1.1 mm.

Accordingly, it is also possible to apply the present invention to this "braid type" heating wire 81 as discussed above, in the same manner as those of the first through the third embodiments.

Although the heating wire 81 as illustrated in FIG. 9 has the structure that the heat boding layer 85 is provided as the top surface layer of the heating wire 81, it is also possible to provide the heating wire 81 which only uses the resistive conductor 83, without using the heat bonding layer 85. In this case, the insulation coating material of the metal wire resistor material as discussed above, may serve as the heat bonding layer, or the heat bonding filament used for the filament of the insulation coating material, may serve as the heat bonding layer.

Fifth Embodiment

Figure 10:
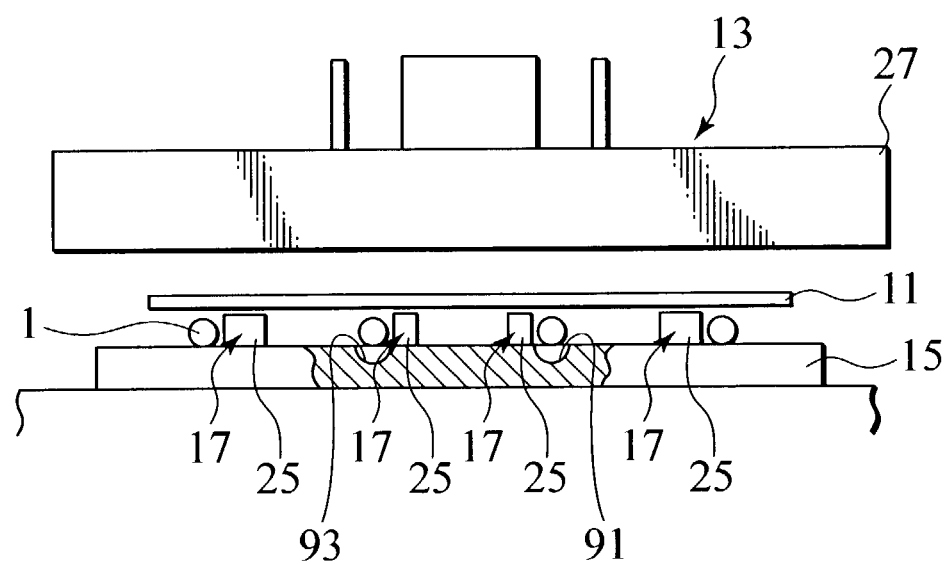
FIG. 10 is side view showing a structure of a hot pressing type of heater manufacturing apparatus according to a fifth embodiment of the present invention.

A fifth embodiment of the present invention will now be described with reference to FIGS. 4, 5 and 10. According to the first through the fourth embodiments, the all length of the heating wire adheres to and is fixed on the base cloth. However, according to the fifth embodiment, there is provided non-bonding portions, which serves as detached parts.

Now referring to the seat heater 31 of FIG. 4, the parts shown by letters A, A' will be bent and pulled in the direction of the vehicle seat 41 as shown in FIG. 5, by relatively strong force, while the seat heater 31 is incorporated in the seat 41. This is because, these parts of the seat heater 31 are caught and pulled by unillustrated threads in the direction of the inside of the vehicle seat 41, so that the seat heater 31 is secured to the vehicle seat 41. At that time, to say nothing of the base cloth 11, the heating wire 1 adhering thereto and being fixed thereon is also pulled in the same direction. However, when such pulling force is applied to the heating wire 1, the heating wire 1 might be considerably bent, which would cause the heating wire being cut. This dangerous situation will be further promoted by passengers sitting on and removing from the vehicle seat 41.

Therefore, according to the fifth embodiment, these bending parts are provided as the non-bonding portions, i.e. the parts at which the heating wire 1 does not adhere to, and is not fixed on, the base cloth 11. As illustrated in FIG. 10, there are hollow parts 91, 93 formed at predetermined positions of the hot pressing aid 15. When the application of the heat and pressure is done by the pressing hot plate 27, the heating wire 1 will go inside the hollow parts 91, 93, thereby the heating wire 1 at these points will not adhere to and be fixed on the base cloth 11. Consequently, the non-bonding portions may be provided at the predetermined position of the heating wire 1.

The position of the non-bonding portion will be determined on a case-by-case basis, and it is possible, not only to provide the continuous form of non-bonding portions in the whole area of the bending parts as discussed above, but also to provide the intermittent non-bonding portions in these bending parts.

According to the fifth embodiment, the non-bonding portion shall serve the detached part. However, it is also possible to provide various structures of the detached part. For example, it is possible to provide the non-bonding portions and the bonding portions one after another, so that they may serve as the detached part. Further, it is also possible to provide an adhering and fixed part at which adherent strength is small, so that it may serve as the detached part.

Further, when the depth of the hollow parts 91, 93 is appropriately adjusted, the condition of the non-bonding portions may be adjusted accordingly, so that the optimum condition of the non-bonding portions may be provided. As for the adjusting means for the hollow parts 91, 93, for example, it is possible to change the depth of the hollow parts 91, 93 on a case-by-case basis, or it is also possible to adjust the depth by intervening elastic materials, etc., having an appropriate thickness, in the hollow parts 91, 93.

Sixth Embodiment

Figure 11:
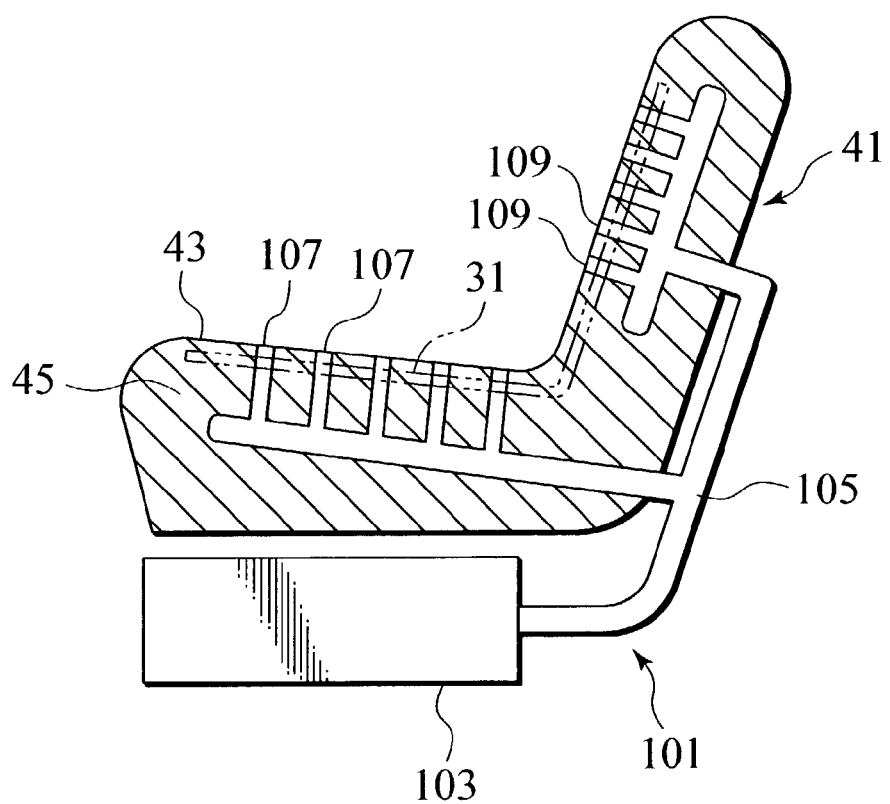
FIG. 11 is a sectional view of a vehicle seat according to a sixth embodiment of the present invention.

A sixth embodiment of the present invention will now be described with reference to FIGS. 5 and 11. According to the sixth embodiment, in particular, the present invention is applied to the vehicle seat 41 as illustrated in FIG. 5, in which, the vehicle seat 41 being equipped with an air conditioning device. As illustrated in FIG. 11, the vehicle seat 41 is equipped with an air conditioning device 101. The air conditioning device comprises a cold/hot wind supplier 103, a piping 105, and a plurality of cold/hot air blowers 107, 109. The seat heater 31 (shown by an imaginary line in FIG. 11) is inserted and placed in a space between the surface cover 41 and the seat pad 45 of the vehicle seat 41 having the above structure.

In the sixth embodiment, the seat heater 31 has the structure that the heating wire 1 adheres to and is fixed on a single sheet of the base cloth 11. Thus, the seat heater 31 has a good ventilation performance, and there is no possibility that the seat heater 31 would cause any bad effect to the cold/hot air supply by the air conditioning device 101. In addition, by appropriately selecting the heating function of the air conditioning device 101 and the heating function of the 31, it is also possible to provide more effective heating system of the vehicle seat 41. For example, a passenger may first use the seat heater 31 when starting the heating, and thereafter, the passenger may switch to the heating by the air conditioner 101.

The present invention is not limited to the first through sixth embodiments as described above.

For example, according to the first through the sixth embodiments, although the clear polyethylene is used as the heat bonding layer of the heating wire, it is also possible to use the polyethylene in any color, by using any dyestuff, etc. In this case, the bonding state (adherent state) between the heating wire and the base cloth may be confirmed easily by the eyes. That is, as for the seat heater in which the heating wire and the base cloth have been melted and bonding to each other, when an inspector sees the seat heater from the reverse side (the side on which the heating wire is not placed), the inspector may see the transparent color of the heat bonding layer of the heating wire. And on the other hand, if there is any trouble in regard to the heat bonding state between the heating wire and the base cloth, the inspector cannot see the transparent color of the heat bonding layer of the heating wire. This function is very useful from the viewpoint of the quality control of the products.

What is claimed is:

1. A seat heater comprising:
   a base cloth which is a non-woven fabric mixed with a heat bonding filament, said heat bonding filament comprising a heat bonding resin; and
   a heating wire having an outer layer which comprises a heat bonding layer and being placed in a predetermined pattern shape on one side of said base cloth,
   a heat bonding structure which bonds said heat bonding layer of said heat wire and said heat bonding filament in said base cloth,
   said base cloth comprises said heat bonding filament in a range between 5 wt. % and 15 wt. %.

2. The seat heater as claimed in claim 1, wherein said heat bonding filament comprising a core-sheath combination structure which includes a sheath and said sheath of said heat bonding filament comprises one of a polypropylene, a polyethylene, and a polyester.

3. The seat heater as claimed in claim 1, wherein said base cloth is heat bonded with at least 30% of an outer periphery of said heating wire.

4. The seat heater as claimed in claim 1, wherein said heat bonding layer of said heating wire comprises a predetermined color.

5. The seat heater as claimed in claim 1, said seat heater is incorporated in a vehicle seat.

6. The seat heater as claimed in claim 5, wherein said vehicle seat comprises an air conditioner.

7. The seat heater according to claim 1, wherein said base cloth comprises an adherent area, and said heating wire comprises an outer periphery portion heat bonded to said adherent area.

8. The seat heater according to claim 1, wherein said base cloth has a thickness of between 0.6 mm-1.4 mm.

9. The seat heater according to claim 1, wherein an adherent strength at an attachment portion between said base cloth and said heating wire is at least 9.8 N/piece.

10. The seat heater according to claim 1, wherein said heating wire further comprises a fuse layer and a nickel wire wrapped around an outer periphery of said fuse layer, and
    wherein said fuse layer and said nickel wire are integrally coated with said heat bonding layer.

11. The seat heater as claimed in claim 1, wherein said heat bonding filament comprising a core-sheath combination structure which includes a sheath and said core-sheath combination structure comprises a core, said sheath and said heat bonding layer being melted and adhered to each other such that said melted and adhered sheath and heat bonding layer surround said core.

12. The seat heater of claim 1, wherein said base cloth is formed between a seat cover and a seat pad of a seat in a vehicle,
    wherein said heating wire is electrically connected to an electric system of a vehicle, said heating wire being adhered to and fixed on said base cloth such that said base cloth is heat bonded with at least 30% of an outer periphery of said heating wire, said heating wire further comprising:
    a heater core comprising a bundle of aromatic polyamide fibers; and
    a metal heating body wrapped in a spiral shape around an outer periphery of said heater core, and
    wherein said heat bonding layer comprises a polyethylene heat bonding layer formed on said metal heating body as an outer layer of said heating wire.

13. The seat heater as claimed in claim 1, wherein said base cloth has a thickness in a range from 0.6 mm to 1.4 mm and is bonded with at least 30% of an outer periphery of said heating wire, and an adherent strength at an attachment portion between said base cloth and said heating wire is at least 9.8 N/piece.

14. The seat heater as claimed in claim 13, wherein said predetermined pattern shape comprises a zig-zag pattern shape.

15. The seat heater as claimed in claim 14, wherein said base cloth comprises a first portion corresponding to a back of a vehicle seat and a second portion corresponding to a bottom of a vehicle seat, and a third portion formed between said first and second portions, said base cloth being bonded to said heating wire in said first and second portions, and not bonded to said heating wire in said third portion.

16. The seat heater of claim 1, wherein the base cloth is dented by the heating wire at a point where the heat bonding layer is bonded to the base cloth.

17. The seat heater as claimed in claim 1, wherein said non-woven fabric is mixed with a predetermined percentage of said heat bonding filament.

18. The seat heater as claimed in claim 17, wherein said predetermined percentage of said heat bonding filament is less than 30%.

19. The seat heater as claimed in claim 17, wherein said predetermined percentage of said heat bonding filament is between 5 wt. % to 15 wt. %.

20. The seat heater as claimed in claim 1, wherein said heat bonding layer is made of polyethylene.

21. A heater comprising:
    a base cloth which is a non-woven fabric mixed with a heat bonding filament, said heat bonding filament comprising a heat bonding resin; and
    a heating wire formed in a predetermined pattern shape on one side of said surface of said base cloth, said heating wire comprising:
    an electric a conductor; and
    a heat bonding layer formed on said electric conductor as an outer layer of said heating wire,
    a heat bonding structure which bonds said heat bonding layer of said heat wire and said heat bonding filament in said base cloth,
    said base cloth comprises said heat bonding filament in a range between 5 wt. % and 15 wt. %.

22. A seat heater comprising:
    a base cloth having a thickness of between 0.6 mm-1.4 mm, and comprising:
    a heat bonding filament having a core-sheath combination structure including a core, and a polyester sheath formed on and around said core; and
    a non-woven fabric which is mixed with said heat bonding filament, a percentage of said heat bonding filament in said base cloth being between 5 wt. % and 15 wt. %;
    a heating wire which is electrically connected to an electric system of a vehicle, said heating wire being heat bonded with on one side of said base cloth in a predetermined pattern shape such that said base cloth is dented by said heating wire and is heat bonded with at least 30% of an outer periphery of said heating wire, said heating wire comprising:
- a heater core comprising a bundle of aromatic polyamide fibers;
- a metal heating body wrapped in a spiral shape around an outer periphery of said heater core; and
- a polyethylene heat bonding layer formed on said metal heating body as an outer layer of said heating wire; and a heat bonding structure which bonds said polyethylene heat bonding layer of said heating wire and said polyester sheath of said base cloth on one side where said heating wire faces with said base cloth.

23. The seat heater of claim 22,
wherein said base cloth is formed between a seat cover and a seat pad of a seat in said vehicle,
wherein an adherent strength at an attachment portion between said base cloth and said heating wire is at least 9.8 N/piece, and
wherein said base cloth comprises a bent portion and said heating wire comprises a nonbonded portion which is formed on said bent portion of said base cloth and is not bonded to said bent portion.

* * * * *